United States Patent
Albano et al.

(10) Patent No.: US 8,893,209 B2
(45) Date of Patent: Nov. 18, 2014

(54) SELECTION OF A PROXY DEVICE FOR A NETWORK

(75) Inventors: Christopher R Albano, Medford, NJ (US); Ross Gilson, Philadelphia, PA (US); Mark Francisco, Clarksburg, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 682 days.

(21) Appl. No.: 12/732,691

(22) Filed: Mar. 26, 2010

(65) Prior Publication Data

US 2010/0251312 A1   Sep. 30, 2010

Related U.S. Application Data

(60) Provisional application No. 61/165,306, filed on Mar. 31, 2009.

(51) Int. Cl.
| | |
|---|---|
| *H04N 7/173* | (2011.01) |
| *H04J 3/08* | (2006.01) |
| *G06F 15/173* | (2006.01) |
| *H04L 12/28* | (2006.01) |
| *H04L 29/08* | (2006.01) |
| *H04L 12/24* | (2006.01) |

(52) U.S. Cl.
CPC .......... *H04L 12/2834* (2013.01); *H04L 67/289* (2013.01); *H04L 12/2898* (2013.01); *H04L 12/2801* (2013.01); *H04L 41/12* (2013.01)
USPC ............ 725/120; 725/121; 370/501; 709/238

(58) Field of Classification Search
CPC .............. H04N 21/437; H04N 21/436; H04N 21/43615; H04N 21/442; H04N 21/44227; H04N 21/44245; H04N 21/4436; H04N 21/637; H04N 21/6371; H04N 21/64723; H04N 21/64738; H04N 12/2834
USPC ..................... 725/74–85, 119, 120, 121, 131; 370/401; 709/238
See application file for complete search history.

(56) References Cited

U.S. PATENT DOCUMENTS

| | | | | |
|---|---|---|---|---|
| 6,061,728 | A | * | 5/2000 | Mead et al. .................... 709/227 |
| 6,442,610 | B1 | * | 8/2002 | Khanna et al. ................ 709/227 |

(Continued)

FOREIGN PATENT DOCUMENTS

| | | |
|---|---|---|
| EP | 1324532 A2 | 7/2003 |
| EP | 2200231 A1 | 6/2010 |

OTHER PUBLICATIONS

EP Application Serial No. 10158338.3, Office Action mailed Jul. 14, 2011.

(Continued)

*Primary Examiner* — James R Sheleheda
(74) *Attorney, Agent, or Firm* — Banner & Witcoff, Ltd.

(57) ABSTRACT

Multiple devices in a user's premises may each be configured to separately communicate with an external network, but the signal strength available to each may vary significantly depending on the wiring of the premises. The disclosure provides methods wherein the various devices may coordinate with one another, and determine which among them has the best signal connection and the most available capacity, and a subset of the devices may be chosen to act as network proxies to relay communications to/from the other devices in the premises.

22 Claims, 6 Drawing Sheets

(56) References Cited

U.S. PATENT DOCUMENTS

| | | | |
|---|---|---|---|
| 6,862,430 B1* | 3/2005 | Duffy et al. | 455/11.1 |
| 7,254,615 B2* | 8/2007 | Taib et al. | 709/209 |
| 7,539,882 B2* | 5/2009 | Jessup et al. | 713/300 |
| 7,634,795 B2* | 12/2009 | Dureau | 725/80 |
| 7,809,386 B2* | 10/2010 | Stirbu | 455/503 |
| 7,954,133 B2* | 5/2011 | Stavenow et al. | 725/141 |
| 7,987,489 B2* | 7/2011 | Krzyzanowski et al. | 725/80 |
| 8,077,686 B2* | 12/2011 | Damle et al. | 370/338 |
| 8,079,074 B2* | 12/2011 | Bahl et al. | 726/11 |
| 8,159,985 B2* | 4/2012 | Karaoguz et al. | 370/312 |
| 8,442,475 B2* | 5/2013 | Antonio et al. | 455/343.1 |
| 2001/0036199 A1* | 11/2001 | Terry | 370/487 |
| 2002/0059634 A1* | 5/2002 | Terry et al. | 725/111 |
| 2002/0122405 A1* | 9/2002 | Liang | 370/344 |
| 2002/0176355 A1* | 11/2002 | Mimms et al. | 370/216 |
| 2002/0178398 A1* | 11/2002 | Sekiguchi | 714/4 |
| 2003/0119445 A1* | 6/2003 | Bromham et al. | 455/39 |
| 2003/0128710 A1 | 7/2003 | Fedyk et al. | |
| 2003/0177219 A1* | 9/2003 | Taib et al. | 709/223 |
| 2004/0139224 A1* | 7/2004 | Nishimura et al. | 709/238 |
| 2005/0053025 A1* | 3/2005 | Duffy et al. | 370/315 |
| 2005/0201301 A1* | 9/2005 | Bridgelall | 370/254 |
| 2006/0280189 A1* | 12/2006 | McRae et al. | 370/401 |
| 2007/0258473 A1* | 11/2007 | Ruffino et al. | 370/401 |
| 2008/0008165 A1* | 1/2008 | Ikeda et al. | 370/360 |
| 2008/0091831 A1* | 4/2008 | Rosenberg | 709/227 |
| 2009/0010205 A1* | 1/2009 | Pratt et al. | 370/328 |
| 2009/0138713 A1* | 5/2009 | Veillette | 713/171 |
| 2009/0228603 A1* | 9/2009 | Ritzau et al. | 709/238 |
| 2010/0251312 A1* | 9/2010 | Albano et al. | 725/78 |
| 2011/0055879 A1* | 3/2011 | Stone et al. | 725/82 |
| 2011/0103392 A1* | 5/2011 | Fan et al. | 370/401 |
| 2011/0296481 A1* | 12/2011 | Cholas et al. | 725/109 |
| 2011/0320379 A1* | 12/2011 | Roslak et al. | 705/345 |

OTHER PUBLICATIONS

EP Search Report in EP App No. 10158338.3-1244, dated Aug. 27, 2010.

* cited by examiner

SELECTION OF A PROXY DEVICE FOR A NETWORK

CROSS REFERENCE TO RELATED CASES

This application claims priority to U.S. Provisional Application Ser. No. 61/165,306, entitled "System and Method for Determining Best DSG Signal Strength," and filed on Mar. 31, 2009.

FIELD OF ART

The features described herein generally relate to communications between devices on a distributed network. For example, some features relate to distributing signals through a television distribution network, and in managing communications over the network.

BACKGROUND

Today, it is not uncommon for a single household to have several televisions throughout the home. Some are in basements, others are in bedrooms, and some are even in bathrooms. To distribute signals to all of these televisions, a typical home may have a significant amount of coaxial cable or optical lines and splitters to take a single input and distribute it throughout the various rooms in the house.

The varying lines and splits, however, create a problem. Although they allow users to have connections throughout their home, the varying splits and lines mean that the various connections have different levels of signal clarity and power. Some locations, such as those that are the farthest from the initial entry point or ones that have one or more splitters between them and the initial entry point, may suffer from significant signal loss between their connection and the initial entry point. In some situations, the signal loss is so severe that certain frequencies become unusable for upstream transmission or downstream reception. The solution is typically either a signal boosting device, or a rewiring of the home, and in some cases these alternatives are undesirable and costly.

There remains a need for offering users the signals and services they want, and in the locations they want.

SUMMARY

This summary is not intended to identify critical or essential features of the disclosures herein, but instead merely summarizes certain features and variations thereof.

In some embodiments, an access method may involve selecting a device (e.g., an interface device, gateway, a set-top box, digital video recorder, end user device, etc.) as a proxy for one or more other devices or, wherein the selected and other devices each contain a modem for an external data network, and are connected to a communication medium of a premises that is communicatively connected to the external data network, and using the selected device as a proxy to carry data between the other one or more devices and the external data network.

The communication used on the premises may be a wired network, or a wireless network, and the external network may also be a wired network or a wireless network. The devices that are using another proxy may deactivate their own modems if they are no longer needed, or they may omit the modems. Alternatively (or additionally), a filter may be used to remove unnecessary communications from shared lines.

The choice of a device to serve as a proxy can be based on a variety of factors, such as the signal reception strength, transmission power level, available bandwidth, etc. To facilitate selection, the various devices may store configuration data for the various devices in the premises.

In some embodiments, selection of a different device to serve as a proxy may occur in response to a topology change at a premise's network (e.g., the addition or removal of a device, wiring, electromagnetic interference, etc.). The selection can also occur in response to a proxy refresh command. In some embodiments, multiple devices may jointly share proxying duties using a schedule of historic device usage.

Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
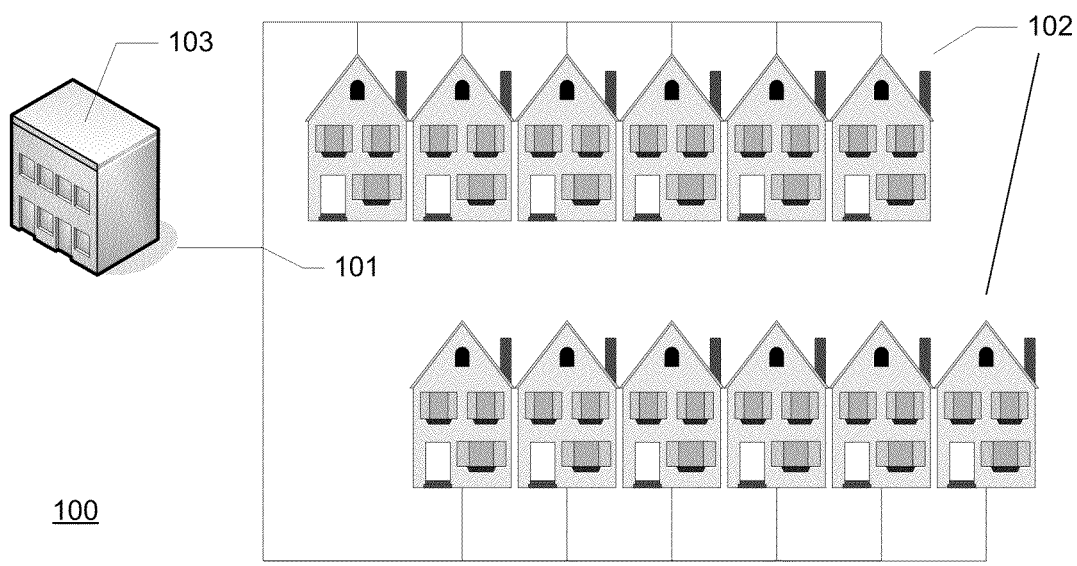
FIG. 1 illustrates an example information distribution network.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax distribution network. Such networks 100 use a series of interconnected communication lines 101 (e.g., coaxial cables, optical fibers, wireless, etc.) to connect multiple homes 102 to a central office or headend 103. The headend 103 may transmit downstream information signals onto the lines 101, and each home 102 may have a tuner used to receive and process those signals.

There may be one line 101 originating from the central office 103, and it may be split a number of times to distribute the signal to various homes 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a modem termination system (MTS), such as a cable modem termination system (CMTS), which may be a computing device configured to manage communications between devices on the network of lines 101 and backend devices such as content sources (e.g., video on demand servers, television program sources, etc.), headend computers and other networks. The MTS may be as specified in a standard, such as the Data Over Cable Service Interface Specification (DOCSIS) standard, published by Cable Television Laboratories, Inc. (a.k.a. CableLabs), or it may be a similar or modified device instead. The MTS may be configured to place data on one or more downstream frequencies to be received by modems at the various homes 102, and to receive upstream communications from those modems on one or more upstream frequencies, as well as to serve as an interface to devices and networks that are further upstream, such as other Internet devices.

Figure 2A:
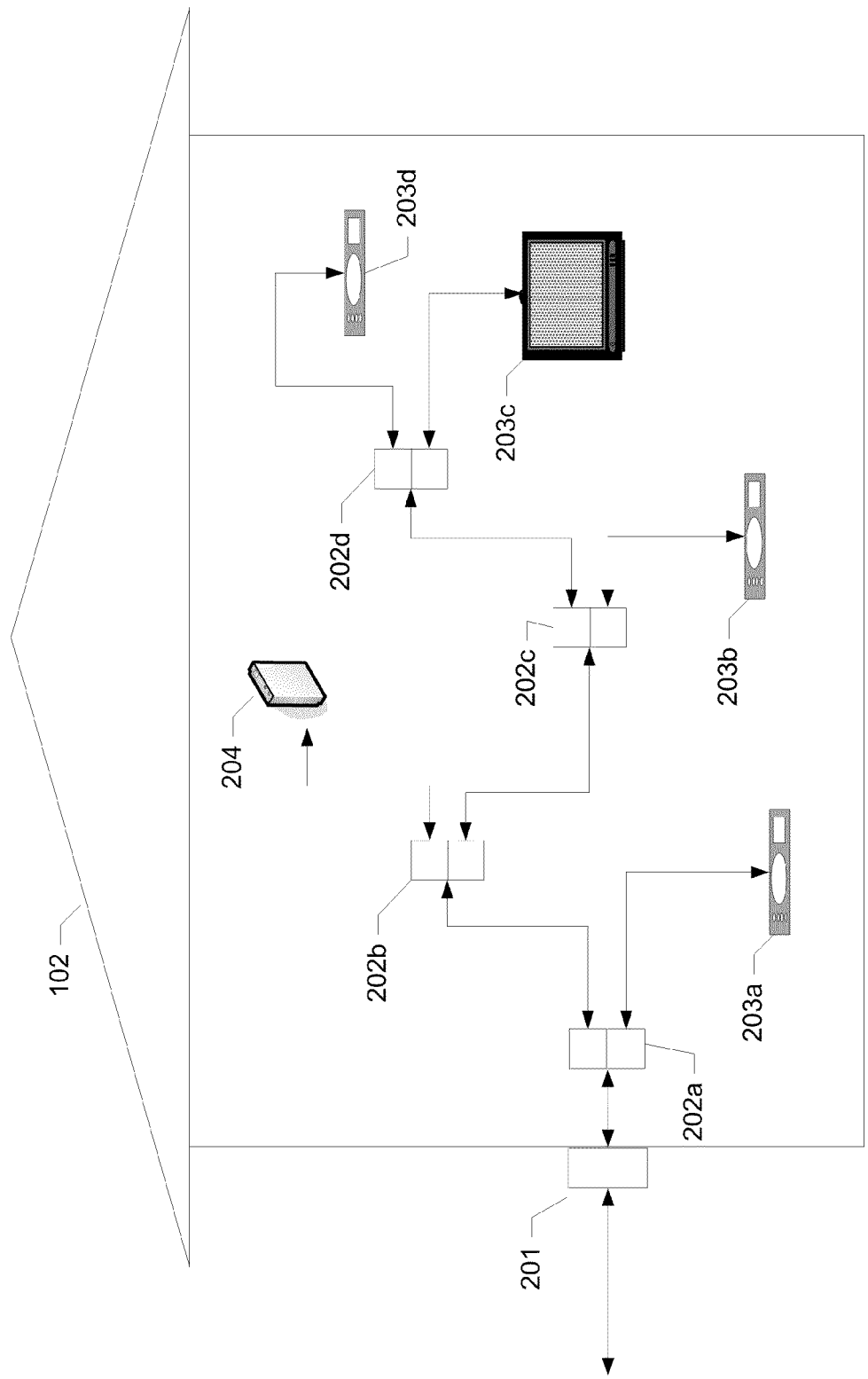
FIGS. 2a-b illustrate an example home in the FIG. 1 network, with an internal distribution of signals to devices.

FIG. 2a illustrates a closer view of a home 102 that may be connected to the network 100 via a line interface 201 (e.g., a line connector or terminator for coaxial cable line, optical fiber line, twisted pair telephone line, wireless, etc.). Within the home 102, the incoming line may be connected to a splitter 202a, which may split the signal to allow it to be carried throughout the home 102. For example, one line may be connected to an interface device, such as a gateway device, digital video recorder (DVR), or a television set-top box 203a (STB). Other splitters 202b,c,d may be used throughout the home 102, carrying the signal to various other components, such as a modem 204, other set-top boxes, digital video recorders, remote storage devices, and other devices such as directly to viewing devices 203b,c,d.

Each splitter 202a-d introduces signal loss to the system, and that signal loss is compounded the more times the signal is split. So, for the FIG. 2a example, interface device 203d may receive a signal that is much weaker than the one received by device 203a, because of the additional splitters 202b,c,d leading to that device 203d. Upstream signals also suffer from similar signal loss, and although modems can increase their transmission strength to a degree to compensate, there is a limit to that. Signal loss may also occur due to the length of the line used to carry a signal to a device, and the route taken within the home. For example, a line that passes through several rooms, or that winds a circuitous path through a room, will be longer than other lines, and that additional length also contributes to signal loss and degradation.

That signal loss may degrade performance of the devices in the home. Many devices 203a-d may include embedded modem-type circuitry, which may be used to receive and transmit two-way signaling with an MTS at a central location. Some MTS devices, such as a CMTS, may employ DOCSIS Set-Top Gateway (DSG) functionality for downstream communications. However, devices having poor signal strength (e.g., device 203d), may not be able to communicate upstream because of the poor signal.

Figure 2B:
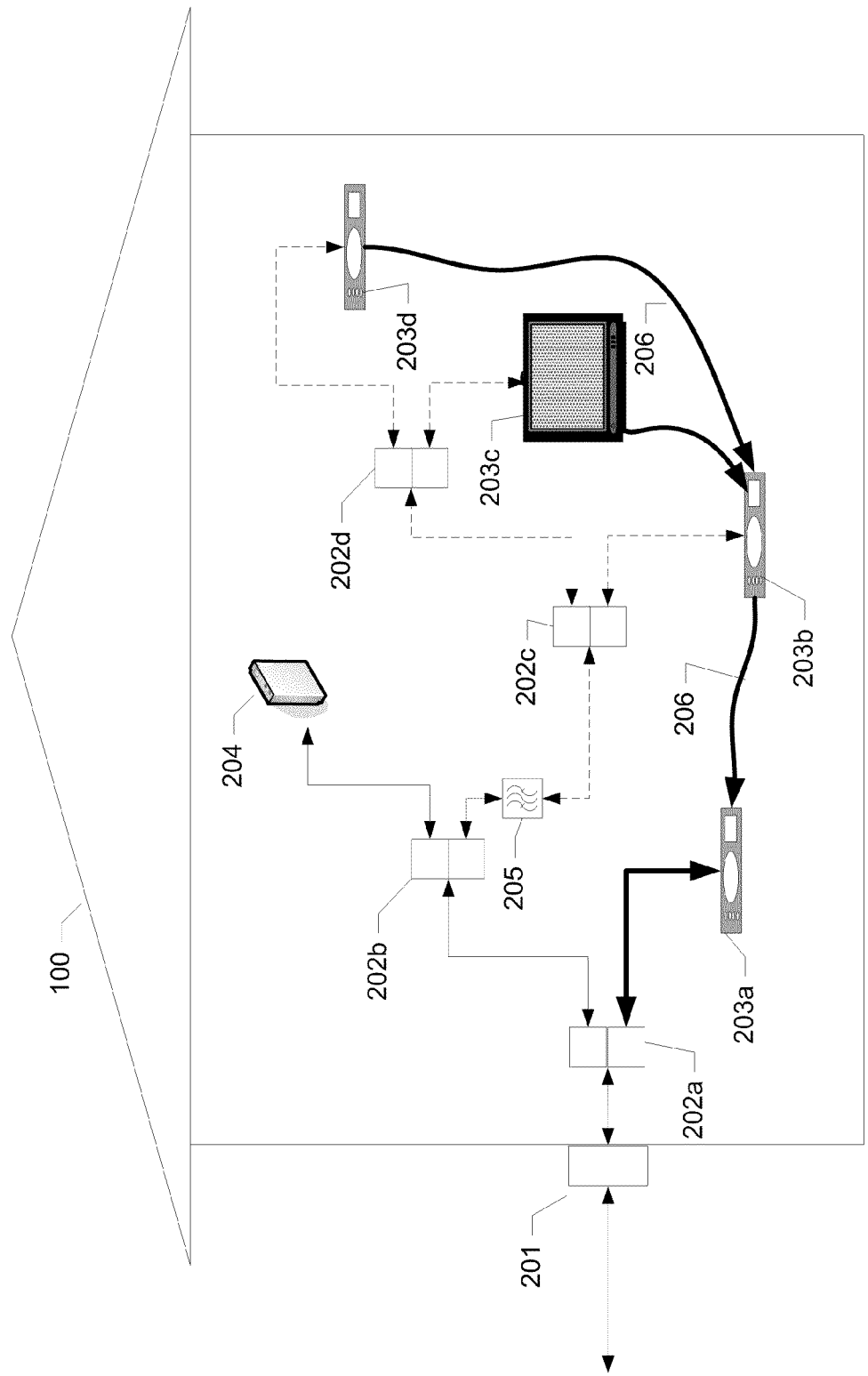

FIG. 2b illustrates an alternative embodiment, in which the various devices 203a-d and modems 204 include additional functionality (e.g., via software, hardware, or a combination). The additional functionality may allow the various devices and modems to communicate with one another, separate from the above-discussed communications. So, for example, such in-home communication may be accomplished using a home access network circuit, such as ones used in a MoCA (Multimedia Over Coax Alliance) or DLNA (Digital Living Network Alliance) node, which allows the various devices 203a-d and modems 204 to communicate with one another over the home's lines without disturbing the signaling carried on those lines. This may be accomplished, for example, by using frequency ranges not used in communications between the MTS and modem, such as DOCSIS communications between a CMTS and a cable modem. Other local area networks may be used as well, such as Ethernet, wireless, twisted pair, etc. For example, IEEE 802.11 Wi-Fi adapters can be used to carry wireless data between the various devices and their corresponding proxy device(s).

Each device 203a-d and modem(s) 204 may also be configured to automatically determine which of them has the strongest upstream connection (e.g., the one that uses the least power to transmit upstream). The one that is determined to have the strongest upstream connection may then operate as a proxy for the others, and can aggregate outgoing signals for the others. FIG. 2b illustrates an example of the FIG. 2a environment, in which device 203a has been determined to have the best upstream connection. In that situation, the other devices 203b,c,d may transmit their outgoing data to the device 203a for upstream transmission as a single (or direct) proxy. The figure illustrates a double-proxy (or indirect proxy), with devices 203c and 203d being proxied by device 203b, which is in turn proxied by device 203a. Such a double-proxy may be optional, particularly if the in-home network supports direct communications between all proxied devices and the main proxy device (e.g., 203a).

The local transmission between devices may be accomplished using any desired localized data transmission technique, such as the MoCA transmission discussed above. In the FIG. 2b example, the lines 206, which may be MoCA lines, refer to logical data connections between the local interface devices. The actual data carried on those logical connections 206 may traverse over the same connection lines illustrated in FIG. 2a (shown in FIG. 2b in dashed lines). Modem 204 is illustrated as maintaining its connectivity (solid lines), which may be useful as the modem 204 itself may already be serving as a proxy for other devices in the home (e.g., a personal computer, gaming console, etc.), but if desired, the modem 204 may also use device 203a as a proxy for its communications as well.

Devices that use another device (e.g., another set-top box or receiver) as a proxy may deactivate their own modems, which can avoid the need for that modem to have its own IP address on an external network, can conserve energy, and can help create a cleaner signal path by minimizing the number of transmitters that actually transmit on the home's 102 outgoing connection 201. Or, the modems may deactivate the transmitter portion, but leave their receiver portions active—consuming a bit more energy, but allowing the modem to continue to receive downstream signals, such as passthrough signals from the proxy device 203a. Alternatively (or additionally), one or more upstream filters 205 may be installed at a position to allow device 203a to continue upstream transmissions, and prevent upstream transmissions of the other devices from reaching the external network. In FIG. 2b, filter 205 may serve such a purpose by, for example, filtering out upstream frequency bands that would otherwise emanate from devices 203b-d.

As noted above, the devices 203a-d may be configured to automatically determine when one of them should serve as the proxy for the others. This may be done based on signal strength measurements, such as determining whether the particular device has been able to achieve an upstream signal lock, and if so, how strong of a lock it has (e.g., the interactive reliability of a set-top box's signal lock, its upstream lock uptime, etc.). For example, this may be based on the transmission power used by each device for its upstream signal lock (e.g., the one using the lowest transmission power may be chosen), or the signal-to-noise ratio of the device's lock. Alternatively, this may be based on which device has the best downstream out-of-band signal strength. The measurement of upstream signal strength can be accomplished in a variety of ways. For example, each device or modem may simply report the strength level it most recently used to communicate with an external termination server. Alternatively, each modem may report the relative strength/error rate of downstream signals that it receives from the external termination server (or from any external source), and use those downstream strengths to estimate upstream signal clarity as well. The various modems may also include signal strength measuring circuitry, allowing them to, for example, measure signal degradation between points within the home network (e.g., degradation between devices 203a and 203b, between devices 203a and 203c, etc.), and share their results to determine signal degradation between any two of them. In some homes, a unidirectional amplifier may have been installed to help boost downstream signal strength to some of the locations in the house, and this can result in wide disparities in the downstream signal strengths. When comparing the various downstream signal strengths, such amplifiers can be detected by determining whether the signal strengths differ by a large enough margin (e.g., +10 dB), since such a large discrepancy generally only occurs if an amplifier has been used on a segment in the home. In response to detecting the presence of such an amplifier, the device or modem having the amplified downstream signal strength may be avoided (and/or reduced in priority) in the proxy selection, on the assumption that its upstream signal strength is probably insufficient if it needed a downstream amplifier. Similarly, if an upstream amplifier was used in the home, a similar signal strength discrepancy may be detected as well, and treated in a similar way.

Other factors may be employed as well. For example, the devices may determine which one has the most available resources (e.g., processor and/or capacity individually, overall system load, etc.), and the one with the most available resources may be chosen.

As another factor, the devices may identify the number of additional devices already being proxied by a given device, and the one with the least management responsibilities may be chosen to serve as a proxy for other devices (e.g., the one supporting the fewest other set-top boxes). This may be useful when a new device is introduced to the home. For example, device 203b is illustrated as being a proxy for devices 203c and 203d, and may be responsible for managing/distributing communications to/from those two devices (and for itself). Device 203b may ultimately pass along upstream data to device 203a for transmission, but device 203a need not expend resources actually managing communications for devices 203c,d. Instead, device 203a may need to only manage resources for device 203b (and itself). So in this situation, if a new device were added, device 203a may be in a better position to accept the responsibilities for managing a new device, since device 203a is managing just one additional device (other than itself), while device 203b is managing two (other than itself).

As another factor, the devices may determine which of them has the highest bandwidth link for the local, in-home communication (e.g., the highest bandwidth MoCA link). For example, some in-home devices may support an older format (e.g., MoCA 1.1), while others may support a newer format (e.g., MoCA 2.0), and this difference in format can affect the actual datarate achievable by the device.

The disclosure above addresses examples of how the various devices may determine which among them should act as a proxy for others, and for which ones. The devices may share their own configuration with the other devices in the local in-home network (e.g., the MoCA network) via transmission on a common local channel. Each device may store configuration data for the other devices within the home for a predetermined period of time (e.g., 1 to 12 weeks), to help simplify the process of making the comparison and conserve memory.

The disclosure above also relates to a selected device becoming a proxy for the others for upstream communication. For upstream communication, the device could simply be a passthrough device, receiving incoming signals from the various other devices in the home, and retransmitting them, unchanged, onto the external network. In other embodiments, the proxy device may manipulate the data before sending it along upstream. This manipulation can include adding encryption or security to the data (e.g., encrypting it, signing it, etc.), removing encryption or security (e.g., decrypting the original signal), changing encryption or security, transcoding (e.g., converting a data or video file from one compression format to another), or any other desired manipulation. In some embodiments, security implemented on the in-home network (e.g., a secure tunnel between devices 203) may be different (e.g., different type, using different keying and/or encryption, etc.) from security implemented on the external network, and the device may need to convert between the different types of security. In another example, the proxy device may conduct an authentication on the other device to verify that it is indeed entitled to transmit signals upstream. The authentication may involve, for example, the proxy device exchanging identity credentials with the other device, performing a challenge/response session, sending an authentication request identifying the other device up to an authentication server, or any other desired type of authentication.

Figure 3:
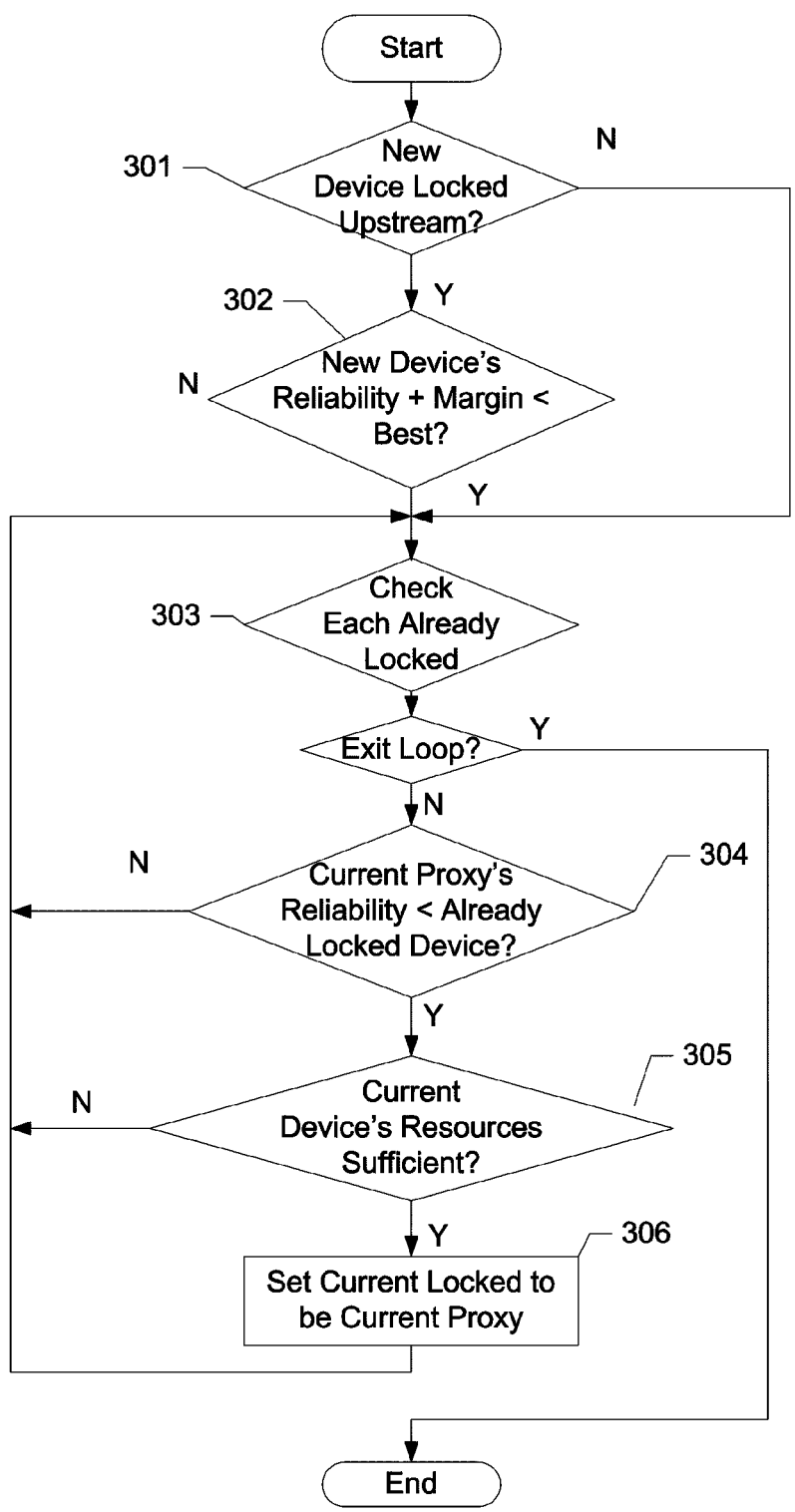
FIG. 3 illustrates an example process of selecting a communication proxy.

FIG. 3 illustrates an example process for determining whether a new device being added to the home (or otherwise being considered for proxy status) is considered for finding a proxy.

An embodiment of the pseudocode for the example process is reproduced below:

```
If (!(locked-upstream) || ((my-reliability + margin) <
    device-best-reliability)) {
        For Each (device-with-upstream-lock) {
            IF (my-reliability < current-device) &&
            (current-device-resources >=
                sufficient resources){
                Use-current-device as proxy
                break
            }
        }
}
```

With reference to FIG. 3, the process may begin when a new device is added to the home, and attempts to get an upstream lock (e.g., an upstream DOCSIS lock). If that lock is unsuccessful, the process may proceed to step 303 to begin a process of finding a proxy device for handling the new device's communications. However, if that lock is successful in step 301, the process may check in step 302 to determine if the lock is the most reliable lock in the home (or if the lock exceeds a predetermined threshold for desirable locks). This determination may include a margin. For example, the current device's lock may need to exceed the current best proxy device by a predetermined margin, to avoid oscillating back-and-forth when two devices have a similarly-strong lock. As noted above, one example pseudocode may check if the new device's reliability+a margin is less than the best device. If its lock is determined to be not the most reliable in step 302, or if the lock failed in step 301, the process may begin a loop in step 303 to determine whether one of the other existing devices in the home may serve as a proxy for the new device. This determination of reliability can be accomplished in any desired fashion. For example, error rates for each candidate device may be compared to determine the most reliable, and the devices may be considered in a sorted order according to their signal characteristics.

In step 304, the reliability of the current proxy for the new interface device is compared with the reliability of the next candidate locked device. And if the new device's proxy is more reliable than the candidate locked device, then the process returns to step 303 to consider the next candidate locked device. This comparison (and the subsequent comparison in 305) can include a certain predefined reliability margin, to avoid unnecessary switching when a candidate device is only marginally better.

If, however, the current proxy for the new device is less reliable than the candidate locked device, then the process may proceed to step 305, and determine if the locked device being considered has sufficient resources to handle another device. This may be done by comparing a minimum resource threshold with the available resources of the existing current device. This may also involve using any of the comparison criteria discussed above.

If the resources are sufficient, the process may move to step 306, and the current candidate device may be assigned to be the proxy for the new device. The process may then loop through the remainder of the candidate locked devices in the home, and at the end of the looping process, the currently-selected proxy becomes the proxy for the new device. The proxy assignment may involve, for example, establishing how the new device will communicate with its proxy using the in-home (e.g., MoCA, wireless, or other) network. If the resources of the candidate device are insufficient in step 305, the process may return to step 303 to consider the next candidate.

This looping process may then conclude when a suitable proxy has been found. If no suitable proxy is found, then the new device can either 1) remain as its own proxy and use its own resources for communicating with the in-home and/or external network (if a lock was successful in step 301), or 2) report an error if a lock was unsuccessful in step 301.

The disclosure above uses the example of a new device coming on to the network. However, the process of finding a suitable proxy configuration (e.g., identifying one or more proxy devices that will communicate with an external network on behalf of one or more other devices) can occur any time there is a change to the topology of the in-home communication network. For example, the addition and/or removal of lines, such as optical, coaxial, or wireless communication lines, from an in-home network can change the signal propagation characteristics in the home's remaining lines, which can improve or worsen the connections that the various other devices 203 may have with the external network. The physical addition and/or removal of devices 203 and/or splitters 202 can similarly alter the signal clarity that the remaining devices 203 may enjoy. Additionally, the turning on/off of various devices can also cause a change in the network's characteristics, and may also result in a proxy becoming available (or unavailable). For example, some users may have devices 203 connected to a simple light switch, and may turn them on/off anytime they enter/leave the room. Such dynamic changes in the topology may result in different devices being chosen for proxy duty.

These changes can be detected automatically (e.g., with frequency response circuitry at the devices 203, through the provisioning/registration of newly added devices, or with messages passed back and forth from new devices to old, etc.). Alternatively, they can be manually indicated by, for example, the user pressing a button on a device 203 or otherwise issuing a command to indicate that a proxy refresh is desired (e.g., pressing a button to cause devices 203 to automatically make a new round of determinations for finding a proxy). Whenever the topology has changed, the devices 203 in the home may undergo a process to identify one or more suitable proxy devices.

Figure 4:
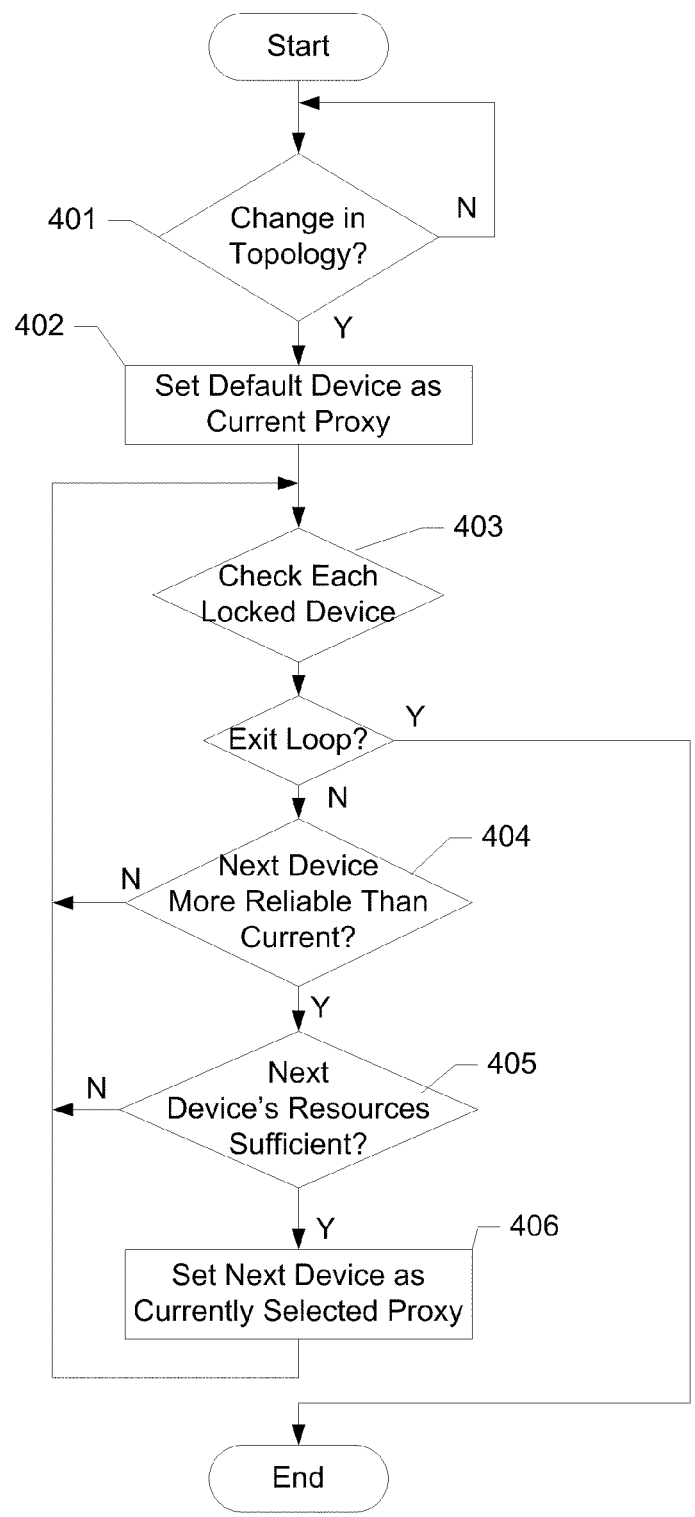
FIG. 4 illustrates another example process of selecting a communication proxy.

FIG. 4 illustrates another example process of the disclosure. In step 401, one or more of the devices 203 may detect that a change to the home's network topology has changed (e.g., addition or removal of a device, line, wiring, etc.). As noted above, this can occur by detecting a change in the signal propagation characteristics of the home's network, or through receiving a message indicating that the change has occurred (e.g., a message from a device 203 that has successfully activated and been provisioned), or through a proxy refresh command to recalibrate the proxy configuration. The change in topology can also occur when devices are powered off or on (e.g., in some homes, a set-top box may be connected to a light switch, and may be completely powered off when not in use. Such a powering off may change the topology by removing an element that would otherwise be transmitting on the network).

If such a topology change has occurred, or if a refresh is requested, then the process may proceed to step 402. In step 402, the various devices may begin to determine which among them has the strongest signal link to the external network (or to a device on the external network, such as a modem termination system on the external network). The process may begin with selecting a default device as the initial proxy. This initial proxy may be the device that, prior to the change in topology, had been acting as the proxy for other devices in the home. Alternatively, the default may simply be a device chosen at random, or the one having the lowest address value, for example.

In step 403, the process may begin checking the various other devices. In step 404, the next device is compared with the current one, and a check is made to determine which of the two has the strongest signal connection with the external network. Again, this can be done by comparing transmission strengths being used, or by comparing received signal strengths. To minimize unnecessary switching, devices having similar signal strengths (e.g., those with signal strengths that are within a predetermined range of one another) may be considered equal, and not "more" reliable. Although the example comparisons discussed above are signal strengths, other characteristics may be used as well, such as signal-to-noise ratios (SNR), bit error rates (BERs), etc.

If the next device's signal strength is no better than the current one, then the process may return to step 403 and check the next device in the home (if any remain). If all devices have been checked, then the currently selected device is chosen as the proxy, and the process concludes with that chosen device operating as a proxy, or one of the proxies, for communications between the other devices in the home and the external network.

If, however, the next device in step 404 was determined to have a stronger signal, then in step 405 that next device may determine whether it has sufficient processing capacity to act as a proxy for one or more other devices. This may be similar to step 305 discussed above.

If that next device's resources are insufficient, then the process may return to step 403. If that next device's resources are sufficient, then the process may proceed to step 406, where that next device is designated as the new currently selected device, and the process may return to step 403 to consider yet another device. The FIG. 4 process may end when, for example, all locked devices have been considered as potential proxies, but none are chosen.

Figure 5:
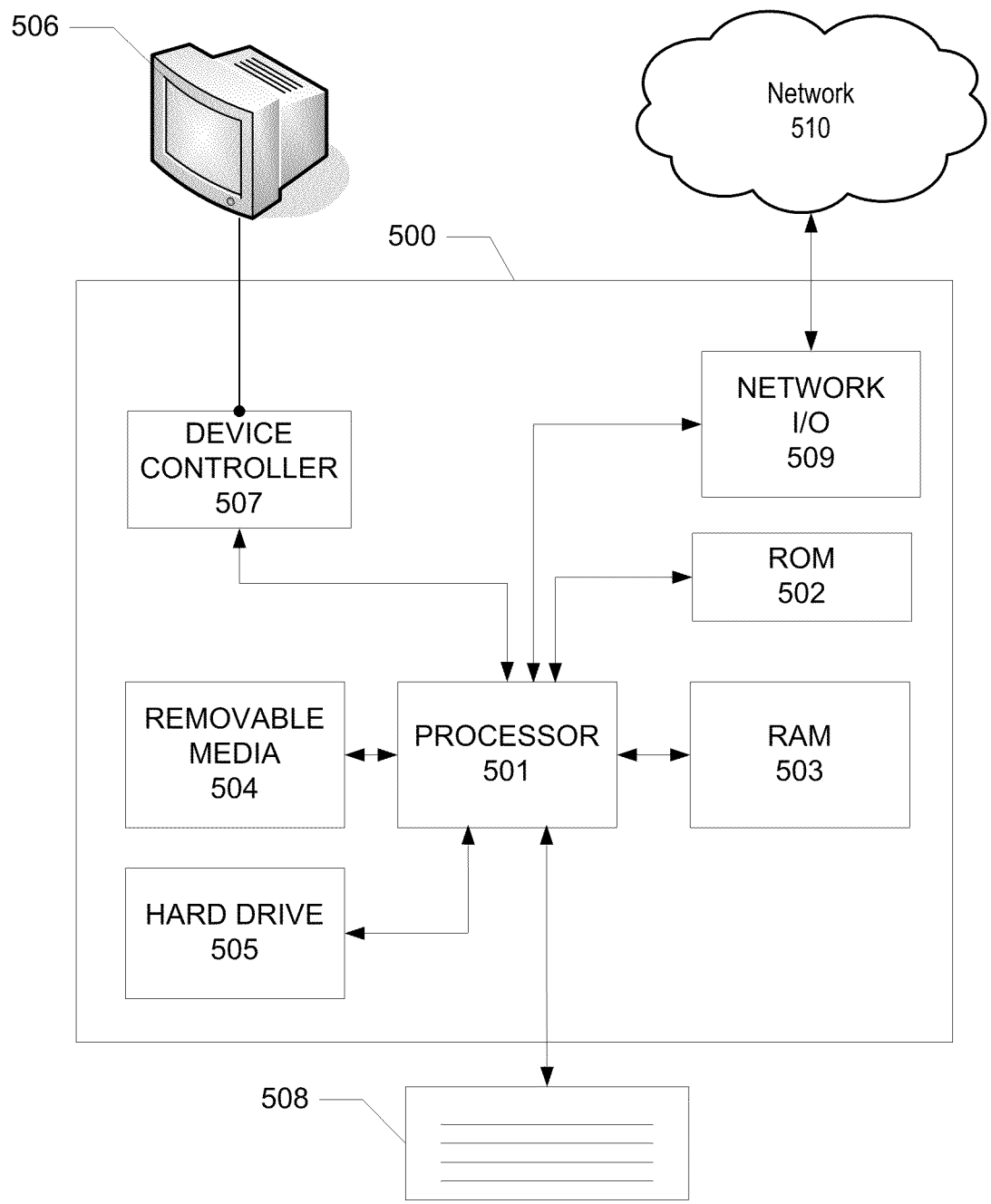
FIG. 5 illustrates example hardware components that may be used to implement any of the devices described herein.

FIG. 5 illustrates general hardware elements of an example device discussed above, which may simply be any type of computing device. The computing device 500 may include one or more processors 501, which may execute instructions of a computer program to perform any of the features described herein. The instructions may be stored in any type of computer-readable medium or memory, to configure the operation of the processor 501. For example, instructions may be stored in a read-only memory (ROM) 502, random access memory (RAM) 503, removable media 504, such as a Universal Serial Bus (USB) drive, compact disk (CD) or digital versatile disk (DVD), floppy disk drive, or any other desired electronic storage medium. Instructions may also be stored in an attached (or internal) hard drive 505. The computing device 500 may include one or more output devices, such as a display 506 (or an external television), and may include one or more output device controllers 507, such as a video processor. There may also be one or more user input devices 508, such as a remote control, keyboard, mouse, touch screen, microphone, etc. The computing device 500 may also include one or more network interfaces, such as input/output circuits 509 (such as a network card) to communicate with an external network 510. The network interface may be a wired interface, wireless interface, or a combination of the two. In some embodiments, the interface 509 may include a modem (e.g., a cable modem), and network 510 may include a provider's wireless, coaxial, fiber, or hybrid fiber/coaxial distribution system (e.g., a DOCSIS network).

The above discussed embodiments are simply examples, and modifications may be made as desired for different implementations. For example, steps and/or components may be subdivided, combined, rearranged, removed and/or augmented as desired. Additional features may be added. For example, the various data traffic carried on the in-premises network 206 may be prioritized and segregated as desired. Data that is more sensitive to latency, such as voice traffic for a VOIP (Voice Over Internet Protocol) call may be given higher priority than other traffic (e.g., e-mails). Signaling sessions may be established with predefined quality of service (QoS) parameters, and the sessions may be distributed among the various proxies to preserve the required QoS for the sessions. For example, when choosing a proxy for a new device, the system may give preference to proxy candidates that have fewer active high QoS sessions.

Another example modification involves the methodology for selecting a proxy. In the FIG. 3 example, the proxy is chosen based on reliability of connection, and when two devices are marginally close to one another, no switch is necessary. In an alternative embodiment, those two marginally-close devices can be alternates to one another, and they may take turns serving as proxy based on historical use data to choose the least-used device for the proxy. For example, the devices may record and share their own use information, identifying usage characteristics for each (e.g., times of day, days of week, programs, bandwidth used). If one of the alternative devices is not typically used in the morning, while the other is not typically used in the evening, then the system may make a proxy selection among these alternates according to their historical unused periods. In that example, the first one may be chosen as a proxy in the morning, while the second one may assume proxy responsibilities in the evening.

The FIG. 3 example flow ends after the current device has checked other locked devices. One modification may involve re-running the method of FIG. 3 periodically, or after a predetermined amount of time passes and if the current device's lock is an undesirable one (e.g., it's signal strength is below an ideal threshold, but is nevertheless the best one available) to select a new proxy. This may occur, for example, in case a new device having a stronger connection comes online at the home. And, although the disclosure discusses devices within a home, the methods may also be applicable to devices within other structures, such as multi-dwelling units, hotels, office parks, and the like.

Another modification can be used in situations where a large number of devices seek to be proxied through a small number of devices having strong signal locks. In such situations, the devices having the strong signal locks can choose to proxy only a subset of the other devices. A rotation may be used, so that each of the other devices may have limited times during a day when their data is proxied. Or, the proxying device(s) can detect usage and/or status of the other devices, and choose the ones that have the greatest need. For example, if two devices have poor connections and need to be proxied, but one of them is in a standby state while the other is actively being used, then the proxying device may choose to service the one that is actively being used. The other inactive device may be forced to use its own poor connection. In some situations, the proxying device may periodically grant temporary access to the inactive device, allowing it to check in with the provider's device.

We claim:

1. A method comprising:
    based on a determination that a signal strength of data received by a first device from an external network has not been amplified by more than a threshold amount, selecting, by a computing device, the first device as a proxy for a second device, wherein the first device and the second device are connected to a communication network associated with a premises, and wherein the communication network associated with the premises is communicatively connected to the external network; and
    in response to selecting the first device as a proxy for the second device:
        routing upstream data from the second device to the external network via the first device; and
        preventing the second device from transmitting data directly to the external network.

2. The method of claim 1, wherein preventing the second device from transmitting data directly to the external network comprises deactivating a transmitter of the second device configured to communicate on the external network.

3. The method of claim 1, wherein preventing the second device from transmitting data directly to the external network comprises activating an upstream filter in the communication network associated with the premises to prevent upstream communications from the second device.

4. The method of claim 1, further comprising routing proxy data between the first device and the second device via the communication network.

5. The method of claim 1, wherein the selecting is further based on a signal strength received at at least one of the first device and the second device within the premises.

6. The method of claim 1, wherein the selecting is further based on at least one of:
    a transmission power level of the first device and the second device within the premises, and
    a bandwidth of the first device on the communication network associated with the premises.

7. The method of claim 1, wherein preventing the second device from transmitting data directly to the external network comprises deactivating a transmitter of the second device, the method further comprising:
    in response to selecting the first device as the proxy for the second device, keeping a receiver of the second device active, wherein the receiver is configured to receive downstream data from the external network.

8. The method of claim 1, wherein selecting the first device as the proxy for the second device comprises:
selecting the first device among a plurality of candidate proxy devices based on the first device having the greatest bandwidth for communications on the communication network associated with the premises.

9. The method of claim 1, wherein the determination that the signal strength of data received by the first device from the external network has not been amplified by more than a threshold amount comprises a determination that the signal strength of data received by the first device from the external network does not exceed a signal strength of data received by another device from the external network by a threshold margin.

10. A method, comprising:
selecting a first device associated with a premises to serve as a proxy for a second device and a third device associated with the premises to communicate with an external network, wherein the first device, the second device, and the third device are interconnected via a premises network;
detecting a topology change in the premises network that changes signal transmission characteristics of the premises network;
based on a determination that a signal strength of data received by the second device from the external network has not been amplified by more than a threshold amount, selecting, by a computing device, the second device to serve as a proxy for the third device associated with the premises to communicate with the external network; and
in response to selecting the second device to serve as the proxy, preventing the third device from transmitting data directly to the external network.

11. The method of claim 10, wherein each of the first device and the second device contains a modem configured to communicate on the external network.

12. The method of claim 10, wherein detecting the topology change comprises detecting addition of a new device to the premises network.

13. The method of claim 10, wherein selecting the first device associated with the premises comprises collecting upstream communications from at least one of the second device and the third device, and transmitting data from those upstream communications to a provider network.

14. The method of claim 10, further comprising transmitting, by the second device, upstream communications on to one or more coaxial cable, optical or wireless transmission lines of the external network.

15. The method of claim 10, further comprising sending, by the second device, upstream communications to an external modem termination system on the external network.

16. The method of claim 10, wherein the selecting the second device to serve as a proxy for the third device is further based on a signal strength between the external network and the first device and a signal strength between the external network and the second device.

17. The method of claim 10, further comprising selecting a fourth device as a proxy for the third device, and using both the second device and fourth device as joint proxies for the third device associated with the premises.

18. The method of claim 17, further comprising:
determining a first time period that usage of the second device is below a first threshold and a second time period that usage of the fourth device is below a second threshold; and
using the second device as the proxy during the first time period and the fourth device as the proxy during the second time period.

19. The method of claim 10, wherein selecting the second device to serve as the proxy for the third device comprises selecting the second device to serve as the proxy for the first device and the third device.

20. A method, comprising:
determining, by a computing device, that a first device of a plurality of devices provisioned for communication with an external network does not use an amplifier external to the first device to boost signal strength of data received by the first device from the external network;
based on the determination, selecting the first device to act as a proxy for the plurality of devices other than the first device in communicating with the external network; and
rerouting upstream communications from the plurality of devices other than the first device to the first device, instead of the external network.

21. The method of claim 20, wherein rerouting upstream communications further comprises
routing the upstream communications to the external network via the first device.

22. The method of claim 20, further comprising:
based on a determination that a signal strength of data received by a second device of the plurality of devices from the external network exceeds the signal strength of data received by the first device by a threshold margin:
determining that the second device uses an amplifier external to the second device to boost the signal strength of data received by the second device from the external network; and
not selecting the second device to act as a proxy for the plurality of devices.

* * * * *

UNITED STATES PATENT AND TRADEMARK OFFICE
CERTIFICATE OF CORRECTION

PATENT NO.          : 8,893,209 B2                                      Page 1 of 1
APPLICATION NO.     : 12/732691
DATED               : November 18, 2014
INVENTOR(S)         : Christopher R. Albano It is certified that error appears in the above-identified patent and that said Letters Patent is hereby corrected as shown below:

In the Claims

Column 12, Line 37:
  In Claim 21, after "comprises", please delete "¶"

Column 12, Line 38:
  In Claim 21, delete "routing" and insert --rerouting--

Signed and Sealed this
Seventh Day of April, 2015

Michelle K. Lee
*Director of the United States Patent and Trademark Office*